US012682169B2

(12) United States Patent
Hong et al.

(10) Patent No.: US 12,682,169 B2
(45) Date of Patent: Jul. 14, 2026

(54) ENTITY RELATION MINING METHOD AND APPARATUS, ELECTRONIC DEVICE, AND STORAGE MEDIUM

(71) Applicant: Beijing Hydrophis Network Technology Co., Ltd., Beijing (CN)

(72) Inventors: Feng Hong, Beijing (CN); Min Huang, Beijing (CN); Weijie Zhou, Beijing (CN); Shanliang Xiong, Beijing (CN); Wenbi Cai, Beijing (CN); Youpeng Wei, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 151 days.

(21) Appl. No.: 18/600,765

(22) Filed: Mar. 10, 2024

(65) Prior Publication Data

US 2024/0311568 A1 Sep. 19, 2024

(30) Foreign Application Priority Data

Mar. 16, 2023 (CN) .......................... 202310269963.0

(51) Int. Cl.
*G06F 40/295* (2020.01)
*G06F 40/284* (2020.01)

(52) U.S. Cl.
CPC .......... *G06F 40/295* (2020.01); *G06F 40/284* (2020.01)

(58) Field of Classification Search
CPC ........................... G06F 16/335; G06F 2216/03
See application file for complete search history.

(56) References Cited

U.S. PATENT DOCUMENTS

| | | | |
|---|---|---|---|
| 11,621,892 B2* | 4/2023 | Kim ........................ | H04L 41/12 |
| | | | 709/223 |
| 2009/0192954 A1* | 7/2009 | Katukuri ................ | G16H 50/70 |
| | | | 706/46 |
| 2020/0074322 A1* | 3/2020 | Chungapalli ........... | G06F 18/29 |

(Continued)

OTHER PUBLICATIONS

Zhao et al. "Effective Distant Supervision for Temporal Relation Extraction". arXiv:2010.12755v2 [cs.CL] Apr. 7, 2021 (Year: 2021).*

(Continued)

*Primary Examiner* — Jesse S Pullias

(57) ABSTRACT

The present invention relates to artificial intelligence and discloses an entity relation mining method, including steps of acquiring enterprise text information, and extracting an enterprise relation instance in the enterprise text information; performing key entity extraction on the enterprise relation instance to obtain a key entity set; identifying an entity relation between key entities in the key entity set and a first relation weight corresponding to the entity relation, and performing weight calculation on the enterprise text information after deletion of the entity relation instance to obtain a second relation weight; and, using an entity relation having the first relation weight or the second relation weight satisfying a preset reference condition as a standard entity relation. The present invention further provides an entity relation mining apparatus, an electronic device and a storage medium. The present invention can improve the accuracy of entity relation mining.

8 Claims, 3 Drawing Sheets

(56) References Cited

U.S. PATENT DOCUMENTS

2021/0117509 A1* 4/2021 Aditya ................... G06F 40/30

OTHER PUBLICATIONS

Mihalcea et al. "TextRank: Bringing Order into Texts". Proceedings of the 2004 Conference on Empirical Methods in Natural Language Processing, Barcelona, Spain (Year: 2004).*

Wu et al. "TIE: A Framework for Embedding-based Incremental Temporal Knowledge Graph Completion". SIGIR '21, Jul. 11-15, 2021, Virtual Event, Canada (Year: 2021).*

Al-Moslmi et al. "Named Entity Extraction for Knowledge Graphs: A Literature Overview". IEEE Access, vol. 8, 2020 (Year: 2020).*

Fu et al. "GraphRel: Modeling Text as Relational Graphs for Joint Entity and Relation Extraction". Proceedings of the 57th Annual Meeting of the Association for Computational Linguistics, pp. 1409-1418 Florence, Italy, Jul. 28-Aug. 2, 2019 (Year: 2019).*

Xu et al. "Mining temporal explicit and implicit semantic relations between entities using web search engines". Future Generation Computer Systems 37 (2014), 468-477 (Year: 2014).*

* cited by examiner

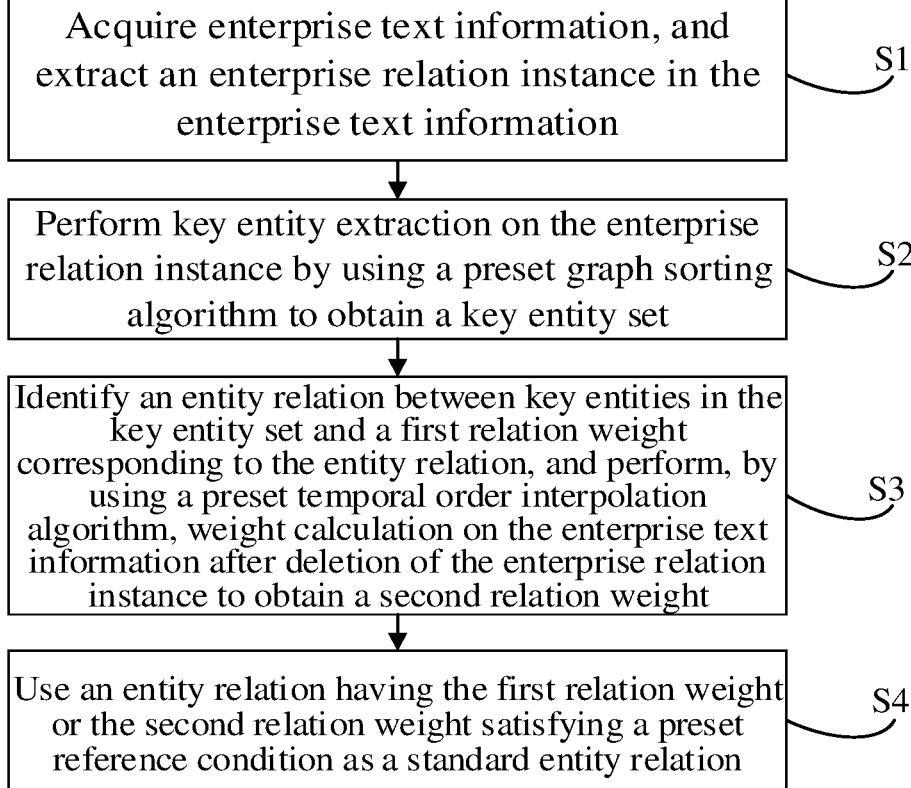

Acquire enterprise text information, and extract an enterprise relation instance in the enterprise text information    S1

Perform key entity extraction on the enterprise relation instance by using a preset graph sorting algorithm to obtain a key entity set    S2

Identify an entity relation between key entities in the key entity set and a first relation weight corresponding to the entity relation, and perform, by using a preset temporal order interpolation algorithm, weight calculation on the enterprise text information after deletion of the enterprise relation instance to obtain a second relation weight    S3

Use an entity relation having the first relation weight or the second relation weight satisfying a preset reference condition as a standard entity relation    S4

FIG. 1

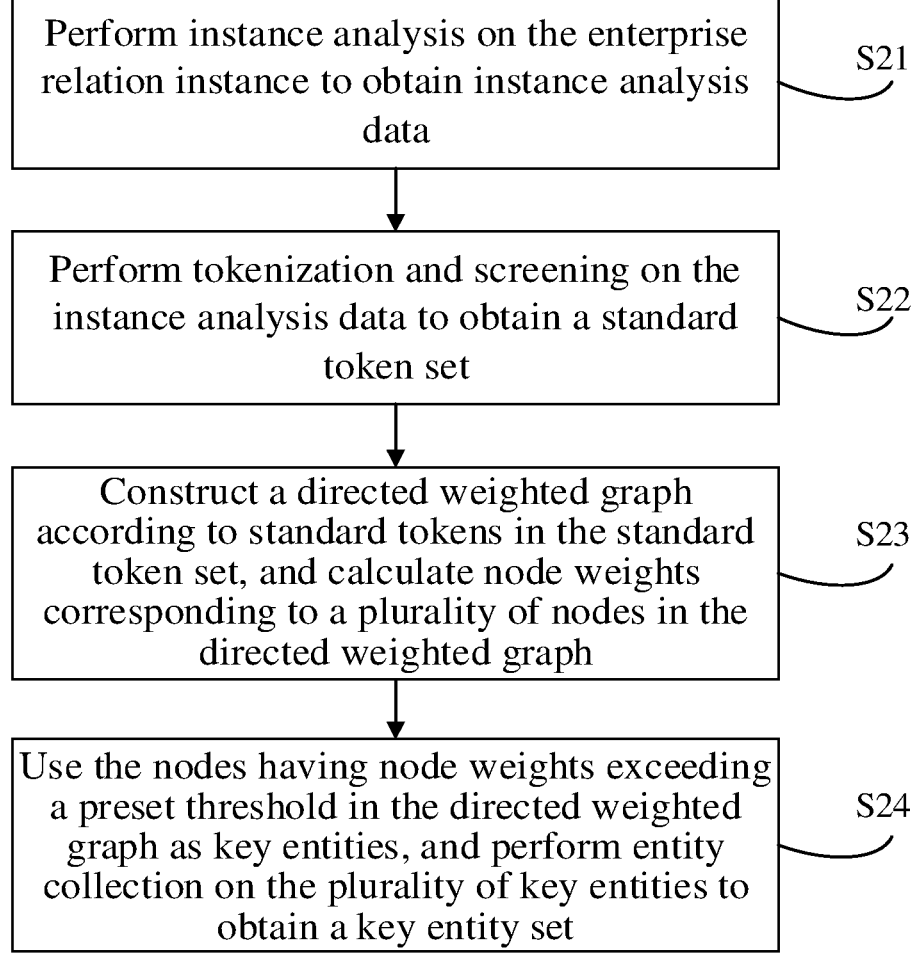

Perform instance analysis on the enterprise relation instance to obtain instance analysis data    S21

Perform tokenization and screening on the instance analysis data to obtain a standard token set    S22

Construct a directed weighted graph according to standard tokens in the standard token set, and calculate node weights corresponding to a plurality of nodes in the directed weighted graph    S23

Use the nodes having node weights exceeding a preset threshold in the directed weighted graph as key entities, and perform entity collection on the plurality of key entities to obtain a key entity set    S24

ENTITY RELATION MINING METHOD AND APPARATUS, ELECTRONIC DEVICE, AND STORAGE MEDIUM

CROSS REFERENCE TO RELATED APPLICATIONS

The present application claims the benefit of Chinese Patent Application No. 202310269963.0 filed on Mar. 16, 2023, the contents of which are incorporated herein by reference in their entirety.

TECHNICAL FIELD

The present invention relates to the field of artificial intelligence, in particular to an entity relation mining method and apparatus, an electronic device, and a storage medium.

BACKGROUND

With the rapid development of globalization, an increasing number of enterprises have sprung up like mushrooms, and more complicated business relations have been formed between enterprises than ever before. In the development progress of enterprises, it is very important for the development of a target enterprise to clearly know other enterprises having business relations with this target enterprise.

The existing methods for mining different entities and relations between entities in the field of enterprise business relation realize entity relation mining by manual tracking and analysis. Such methods cannot analyze a large number of enterprise business relations, and have low accuracy in entity relation extraction. Therefore, there is an urgent need for an entity relation mining method with high accuracy.

SUMMARY

The present invention provides an entity relation mining method and apparatus, an electronic device, and a storage medium, with the main objective of improving the accuracy of entity relation mining.

To achieve the above objective, the present invention provides an entity relation mining method, including steps of:

acquiring enterprise text information, and extracting an enterprise relation instance in the enterprise text information;

performing key entity extraction on the enterprise relation instance by using a preset graph sorting algorithm to obtain a key entity set;

identifying an entity relation between key entities in the key entity set and a first relation weight corresponding to the entity relation, deleting the enterprise relation instance from the enterprise text information, and performing, by using a preset temporal order interpolation algorithm, weight calculation on the enterprise text information after deletion of the enterprise relation instance to obtain a second relation weight; and using an entity relation having the first relation weight or the second relation weight satisfying a preset reference condition as a standard entity relation.

Optionally, the extracting an enterprise relation instance in the enterprise text information includes:

acquiring a preset data structure template, and searching structure data corresponding to the preset data structure template from the enterprise text information; and performing data combination on the structure data to obtain an enterprise relation instance.

Optionally, the performing key entity extraction on the enterprise relation instance by using a preset graph sorting algorithm to obtain a key entity set includes:

performing instance analysis on the enterprise relation instance to obtain instance analysis data;

performing tokenization and screening on the instance analysis data to obtain a standard token set;

constructing a directed weighted graph according to standard tokens in the standard token set, and calculating node weights corresponding to a plurality of nodes in the directed weighted graph; and using the nodes having node weights exceeding a preset threshold in the directed weighted graph as key entities, and performing entity collection on the plurality of key entities to obtain a key entity set.

Optionally, the performing tokenization and screening on the instance analysis data to obtain a standard token set includes:

performing sentence segmentation on the instance analysis data according to a preset symbol to obtain a segmented sentence set;

deleting stop words in the segmented sentence set, and performing tokenization on segmented sentences after deletion of the stop words to obtain an initial token set; and performing part-of-speech tagging on a plurality of initial tokens in the initial token set, and reserving initial tokens consistent with a preset specified part of speech as standard tokens to obtain a standard token set.

Optionally, the node weights corresponding to a plurality of nodes in the directed weighted graph are calculated by the following method:

$$WS(V_i) = (1-d) + d * \sum_{V_j \in In(V_i)} \frac{W_{ji}}{\sum_{V_k \in Out(V_j)} W_{jk}} WS(V_j)$$

where $WS(V_i)$ represents a node weight of a node $V_i$, d is a damping coefficient, $In(V_i)$ is a first node set pointing to the node $V_i$, $Out(V_j)$ is a second node set pointed by the node $V_i$, $W_{ji}$ is a connection weight between nodes $V_1$ and $V_j$, and $W_{jk}$ is a connection weight between nodes $V_k$ and $V_j$.

Optionally, the identifying an entity relation between key entities in the key entity set and a first relation weight corresponding to the entity relation includes:

extracting, from the enterprise relation instance, an entity relation corresponding to key entities in the key entity set; and acquiring an occurrence frequency of the entity relation within a preset period of time, and using the occurrence frequency as a first relation weight corresponding to the entity relation.

Optionally, the performing, by using a preset temporal order interpolation algorithm, weight calculation on the enterprise text information after deletion of the enterprise relation instance to obtain a second relation weight includes:

when the enterprise text information does not contain enterprise relation instances, backtracking historical text information corresponding to the enterprise text information; and extracting a historical entity relation in the historical text information, calculating a weight of the historical entity relation according to the temporal order interpolation algorithm, and using the weight of the historical entity relation as a second relation weight.

To solve the above problem, the present invention further provides an entity relation mining apparatus, including:

an instance extraction module, configured to acquire enterprise text information and extract an enterprise relation instance in the enterprise text information;

an entity extraction module, configured to perform key entity extraction on the enterprise relation instance by using a preset graph sorting algorithm to obtain a key entity set;

a weight calculation module, configured to identify an entity relation between key entities in the key entity set and a first relation weight corresponding to the entity relation, delete the enterprise relation instance from the enterprise text information, and perform, by using a preset temporal order interpolation algorithm, weight calculation on the enterprise text information after deletion of the enterprise relation instance to obtain a second relation weight; and a relation mining module, configured to use an entity relation having the first relation weight or the second relation weight satisfying a preset reference condition as a standard entity relation.

To solve the above problem, the present invention further provides an electronic device, including:

at least one processor; and a memory in communication connection to the at least one processor, wherein, the memory has computer programs executable by the at least one processor stored thereon that, when executed by the at least one processor, enable the at least one processor to execute the entity relation mining method described above.

To solve the above problem, the present invention further provides a storage medium having at least one computer program stored thereon that, when executed by a processor in an electronic device, implements the entity relation mining method described above.

In the embodiments of the present invention, an enterprise relation instance in enterprise text information is extracted to obtain data after preliminary screening of text information, and key entities in the enterprise relation instance are extracted by using a graph sorting algorithm, so that the key entities can be obtained accurately; a first relation weight of the key entities and a second relation weight of the enterprise text information after deletion of the enterprise relation instance are identified, respectively; and an entity relation satisfying a preset reference condition is screened out according to the first relation weight and the second relation weight. The occurrence frequency of the entity relation is analyzed from the perspective of weight by using the first relation weight and the second relation weight, so the screened standard entity relation is more accurate and more efficient. Therefore, the entity relation mining method and apparatus, the electronic device and the storage medium provided by the present invention can solve the problem of low accuracy in entity relation mining.

BRIEF DESCRIPTION OF THE ACCOMPANYING DRAWINGS

FIG. 1 is a schematic flowchart of an entity relation mining method according to an embodiment of the present invention;

FIG. 2 is a schematic diagram of a specific implementation process of a step S2 in FIG. 1;

Figure 3:
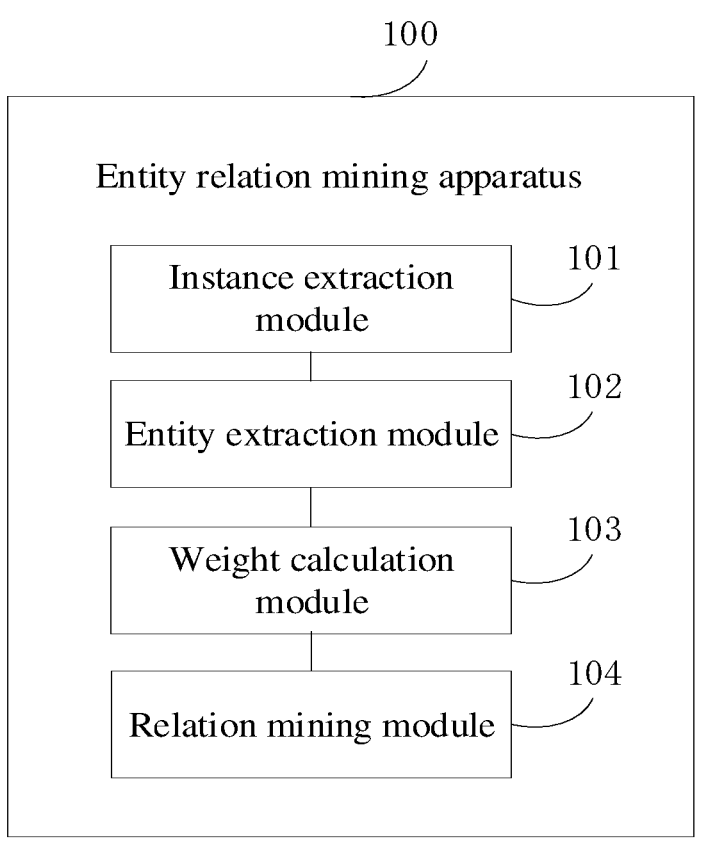
FIG. 3 is a functional module diagram of an entity relation mining apparatus according to an embodiment of the present invention.

The objective realization, functional characteristics and advantages of the present invention will be further described by embodiments with reference to the drawings.

DETAILED DESCRIPTION OF ILLUSTRATED EMBODIMENTS

It should be understood that the specific embodiments described herein are merely for explaining the present invention, rather than limiting the present invention.

An embodiment of the present application provides an entity relation mining method. The executive body of the entity relation mining method includes, but is not limited to, at least one of a server, a terminal or other electronic devices capable of being configured to execute the method provided in the embodiment of the present application. In other words, the entity relation mining method may be executed by software or hardware installed in a terminal device or a server device, and the software may be a blockchain platform. The server includes, but is not limited to: a single server, a server cluster, a cloud server, a cloud server cluster or the like. The server may be a standalone server, or may be a cloud server that provides basic cloud computing services, such as cloud services, cloud databases, cloud computing, cloud functions, cloud storage, network services, cloud communication, middle services, domain name services, security services, content delivery networks (CDNs), and big data and artificial intelligence platforms.

With reference to FIG. 1, a schematic flowchart of an entity relation mining method according to an embodiment of the present invention is shown. In this embodiment, the entity relation mining method includes the following steps.

In S1, enterprise text information is acquired, and an enterprise relation instance in the enterprise text information is extracted.

In the embodiment of the present invention, the enterprise text information refers to various forms of texts related to enterprise information in the field of enterprise business relation, for example, news articles, industry reports, technical articles or the like.

Specifically, the extracting an enterprise relation instance in the enterprise text information includes:

acquiring a preset data structure template, and searching structure data corresponding to the preset data structure template from the enterprise text information; and performing data combination on the structure data to obtain an enterprise relation instance.

Specifically, the preset data structure template contains different template entries, such as entity name, relation type, date and source. Text information data corresponding to the template entries is searched from the enterprise text information, and the text information data is combined to obtain an enterprise relation instance.

For example, the enterprise relation instance may be that the enterprise name is company A and company B, and the relation type may be competition, cooperation, holding, supply, merger, merger and acquisition or the like. The date may be a specific time limit, and the source refers to a website or document to which the enterprise text information belongs.

In S2, key entity extraction is performed on the enterprise relation instance by using a preset graph sorting algorithm to obtain a key entity set.

In the embodiment of the present invention, with reference to FIG. 2, the performing key entity extraction on the enterprise relation instance by using a preset graph sorting algorithm to obtain a key entity set includes:

S21, performing instance analysis on the enterprise relation instance to obtain instance analysis data;

S22, performing tokenization and screening on the instance analysis data to obtain a standard token set;

S23, constructing a directed weighted graph according to standard tokens in the standard token set, and calculating node weights corresponding to a plurality of nodes in the directed weighted graph; and S24, using the nodes having node weights exceeding a preset threshold in the directed weighted graph as key entities, and performing entity collection on the plurality of key entities to obtain a key entity set.

Specifically, entity analysis refers to the extraction of data under different template entries in the enterprise relation instance, and the tokenization may be implemented by a benchmark tokenizer. The graph sorting algorithm may be a TextRank model that can extract key entities in a text.

The TextRank model is a graph-based sorting model for text. Its basic idea is to divide a text into several constituent units (words or sentences) and establish a graph model which is essentially a directed weighted graph.

Specifically, the performing tokenization and screening on the instance analysis data to obtain a standard token set includes: performing sentence segmentation on the instance analysis data according to a preset symbol to obtain a segmented sentence set;

deleting stop words in the segmented sentence set, and performing tokenization on segmented sentences after deletion of the stop words to obtain an initial token set; and performing part-of-speech tagging on a plurality of initial tokens in the initial token set, and reserving initial tokens consistent with a preset specified part of speech as standard tokens to obtain a standard token set.

Specifically, the preset symbol may be a full stop, and the deletion of the stop words in the segmented sentence set may be performed by comparison with reference to the existing stop word removal list. The tokenization may adopt a trained tokenization model or a benchmark tokenizer, and the preset specified part of speech may be noun, verb and adjective.

In the embodiment of the present invention, the node weight is calculated by the following formula:

$$WS(V_i) = (1-d) + d * \sum_{V_j \in In(V_i)} \frac{W_{ji}}{\sum_{V_k \in Out(V_j)} W_{jk}} WS(V_j)$$

where $WS(V_i)$ represents a node weight of a node $V_i$, d is a damping coefficient, $In(V_i)$ is a first node set pointing to the node $V_i$, $Out(V_j)$ is a second node set pointed by the node $V_i$, $W_{ji}$ is a connection weight between nodes $V_i$ and $V_j$, and $W_{jk}$ is a connection weight between nodes $V_k$ and $V_j$.

The damping coefficient d represents the probability of pointing from a specific point to any other point in the directed weighted graph, and the damping coefficient preferably has a value of 0.85.

In S3, an entity relation between key entities in the key entity set and a first relation weight corresponding to the entity relation are identified, the enterprise relation instance is deleted from the enterprise text information, and weight calculation is performed on the enterprise text information after deletion of the enterprise relation instance by using a preset temporal order interpolation algorithm to obtain a second relation weight.

In the embodiment of the present invention, the identifying an entity relation between key entities in the key entity set and a first relation weight corresponding to the entity relation includes:

extracting, from the enterprise relation instance, an entity relation corresponding to key entities in the key entity set; and acquiring an occurrence frequency of the entity relation within a preset period of time, and using the occurrence frequency as a first relation weight corresponding to the entity relation.

Specifically, the enterprise relation instance contains an enterprise relation type, for example, competition, cooperation, holding, supply, merger, merger and acquisition or the like. The extracted entity relation corresponding to the key entities is the enterprise relation type. The obtained occurrence frequency of the entity relation within the preset period of time refers to the ratio of the number of occurrences of a certain business relation to the number of occurrences of all business relations between two enterprise entities, i.e., the occurrence probability. The occurrence probability is used as the first relation weight corresponding to the entity relation.

Specifically, the performing, by using a preset temporal order interpolation algorithm, weight calculation on the enterprise text information after deletion of the enterprise relation instance to obtain a second relation weight includes:

when the enterprise text information does not contain enterprise relation instances, backtracking historical text information corresponding to the enterprise text information; and extracting a historical entity relation in the historical text information, calculating the weight of the historical entity relation according to the temporal order interpolation algorithm, and using the weight of the historical entity relation as a second relation weight.

Specifically, the enterprise text information not containing enterprise relation instances means that there is no relation instance in the enterprise text information, and the entity relation in the relation instance refers to a continuous entity relation between enterprises. The continuous entity relation means that the relation will last for a period of time but is not a one-time event relation. For example, competition, cooperation, holding and supply are all continuous competitive relations.

When the enterprise text information does not contain enterprise relation instances, it is impossible to directly acquire the corresponding weight, and it is necessary to backtrack the historical text information corresponding to the enterprise text information. For example, if there was no competitive relation between enterprise A and enterprise B in June 2000, that is, there was no relation instance in June 2000, in this case, it is impossible to calculate the corresponding weight according to the enterprise text information. Thus, it is necessary to backtrack the historical text information of this relation in January 2000 and calculate the weight corresponding to the historical entity relation in the historical text information, and the weight corresponding to the historical entity relation is used as the second relation weight.

Preferably, a weight of an entity relation when no enterprise business relation occurs within a specified period of time is calculated by using the temporal order interpolation algorithm, wherein the temporal order interpolation algorithm may be a linear interpolation algorithm or a polynomial interpolation algorithm. Thus, any continuous relation between any enterprises within the specified period of time has a weight at any time, thereby ensuring the accuracy of data.

In S4, an entity relation having the first relation weight or the second relation weight satisfying a preset reference condition is used as a standard entity relation.

In the embodiment of the present invention, both the first relation weight and the second relation weight are used for describing the occurrence frequency of an entity relation, wherein the first relation weight is calculated when the enterprise relation instance contains entity relations, and the second relation weight is obtained by calculating the historical text information using the preset temporal order interpolation algorithm when the enterprise relation instance does not contain entity relations. The first relation weight or the second relation weight is compared with the preset reference condition, and an entity relation satisfying the preset reference condition is used as a standard entity relation.

In the embodiment of the present invention, an enterprise relation instance in enterprise text information is extracted to obtain data after preliminary screening of text information, and key entities in the enterprise relation instance are extracted by using a graph sorting algorithm, so that the key entities can be obtained accurately; a first relation weight of the key entities and a second relation weight of the enterprise text information after deletion of the enterprise relation instance are identified, respectively; and an entity relation satisfying a preset reference condition is screened out according to the first relation weight and the second relation weight. The occurrence frequency of the entity relation is analyzed from the perspective of weight by using the first relation weight and the second relation weight, so the screened standard entity relation is more accurate and more efficient. Therefore, the entity relation mining method provided by the present invention can solve the problem of low accuracy in entity relation mining.

As shown in FIG. 3, a functional module diagram of an entity relation mining apparatus according to an embodiment of the present invention is shown.

The entity relation mining apparatus 100 described herein may be installed in an electronic device. Depending upon the realized functions, the entity relation mining apparatus 100 may include an instance extraction module 101, an entity extraction module 102, a weight calculation module 103 and a relation mining module 104. The modules described herein may also called units, which refer to a series of computer program segments that can be executed by a processor of the electronic device and can complete fixed functions, and are stored in a memory of the electronic device.

In this embodiment, the function of each module/unit is described below:

the instance extraction module 101 is configured to acquire enterprise text information and extract an enterprise relation instance in the enterprise text information;

the entity extraction module 102 is configured to perform key entity extraction on the enterprise relation instance by using a preset graph sorting algorithm to obtain a key entity set;

the weight calculation module 103 is configured to identify an entity relation between key entities in the key entity set and a first relation weight corresponding to the entity relation, delete the enterprise relation instance from the enterprise text information, and perform, by using a preset temporal order interpolation algorithm, weight calculation on the enterprise text information after deletion of the enterprise relation instance to obtain a second relation weight; and the relation mining module 104 is configured to use an entity relation having the first relation weight or the second relation weight satisfying a preset reference condition as a standard entity relation.

Specifically, the specific implementation modes of the modules in the entity relation mining apparatus 100 are described below.

In step 1, enterprise text information is acquired, and an enterprise relation instance in the enterprise text information is extracted.

In the embodiment of the present invention, the enterprise text information refers to various forms of texts related to enterprise information in the field of enterprise business relation, for example, news articles, industry reports, technical articles or the like.

Specifically, the extracting an enterprise relation instance in the enterprise text information includes:

acquiring a preset data structure template, and searching structure data corresponding to the preset data structure template from the enterprise text information; and performing data combination on the structure data to obtain an enterprise relation instance.

Specifically, the preset data structure template contains different template entries, such as entity name, relation type, data and source. Text information data corresponding to the template entries is searched from the enterprise text information, and the text information data is combined to obtain an enterprise relation instance.

For example, the enterprise relation instance may be that the enterprise name is company A and company B, and the relation type may be competition, cooperation, holding, supply, merger, merger and acquisition or the like. The date may be a specific time limit, and the source refers to a website or document to which the enterprise text information belongs.

In step 2, key entity extraction is performed on the enterprise relation instance by using a preset graph sorting algorithm to obtain a key entity set.

In the embodiment of the present invention, the performing key entity extraction on the enterprise relation instance by using a preset graph sorting algorithm to obtain a key entity set includes:

performing instance analysis on the enterprise relation instance to obtain instance analysis data;

performing tokenization and screening on the instance analysis data to obtain a standard participle set;

constructing a directed weighted graph according to standard tokens in the standard token set, and calculating node weights corresponding to a plurality of nodes in the directed weighted graph; and using the nodes having node weights exceeding a preset threshold in the directed weighted graph as key entities, and performing entity collection on the plurality of key entities to obtain a key entity set.

Specifically, the entity analysis refers to the extraction of data under different template entries in the enterprise relation instance, and the tokenization may be implemented by a benchmark tokenizer. The graph sorting algorithm may be a TextRank model that can extract key entities in a text.

The TextRank model is a graph-based sorting model for text. Its basic idea is to divide a text into several constituent units (words or sentences) and establish a graph model which is essentially a directed weighted graph.

Specifically, the performing tokenization and screening on the instance analysis data to obtain a standard token set includes:

performing sentence segmentation on the instance analysis data according to a preset symbol to obtain a segmented sentence set;

deleting stop words in the segmented sentence set, and performing tokenization on segmented sentences after deletion of the stop words to obtain an initial token set; and performing part-of-speech tagging on a plurality of initial tokens in the initial token set, and reserving initial tokens consistent with a preset specified part of speech as standard tokens to obtain a standard token set.

Specifically, the preset symbol may be a full stop, and the deletion of the stop words in the segmented sentence set may be performed by comparison with reference to the existing stop word removal list. The tokenization may adopt a trained tokenization model or a benchmark tokenizer, and the preset specified part of speech may be noun, verb and adjective.

In the embodiment of the present invention, the node weight is calculated by the following formula:

$$WS(V_i) = (1-d) + d * \sum_{V_j \in In(V_i)} \frac{W_{ji}}{\sum_{V_k \in Out(V_j)} W_{jk}} WS(V_j)$$

where $WS(V_i)$ represents a node weight of a node $V_i$, d is a damping coefficient, $In(V_i)$ is a first node set pointing to the node $V_i$, $Out(V_j)$ is a second node set pointed by the node $V_i$, $W_{ji}$ is a connection weight between nodes $V_i$ and $V_j$, and $W_{jk}$ is a connection weight between nodes $V_k$ and $V_j$.

The damping coefficient d represents the probability of pointing from a specific point to any other point in the directed weighted graph, and the damping coefficient preferably has a value of 0.85.

In step 3, an entity relation between key entities in the key entity set and a first relation weight corresponding to the entity relation are identified, the enterprise relation instance is deleted from the enterprise text information, and weight calculation is performed on the enterprise text information after deletion of the enterprise relation instance by using a preset temporal order interpolation algorithm to obtain a second relation weight.

In the embodiment of the present invention, the identifying an entity relation between key entities in the key entity set and a first relation weight corresponding to the entity relation includes:

extracting, from the enterprise relation instance, an entity relation corresponding to key entities in the key entity set; and acquiring an occurrence frequency of the entity relation within a preset period of time, and using the occurrence frequency as a first relation weight corresponding to the entity relation.

Specifically, the enterprise relation instance contains an enterprise relation type, for example, competition, cooperation, holding, supply, merger, merger and acquisition or the like. The extracted entity relation corresponding to the key entities is the enterprise relation type. The obtained occurrence frequency of the entity relation within the preset period of time refers to the ratio of the number of occurrences of a certain business relation to the number of occurrences of all business relations between two enterprise entities, i.e., the occurrence probability. The occurrence probability is used as the first relation weight corresponding to the entity relation.

Specifically, the performing, by using a preset temporal order interpolation algorithm, weight calculation on the enterprise text information after deletion of the enterprise relation instance to obtain a second relation weight includes:

when the enterprise text information does not contain enterprise relation instances, backtracking historical text information corresponding to the enterprise text information; and extracting a historical entity relation in the historical text information, calculating the weight of the historical entity relation according to the temporal order interpolation algorithm, and using the weight of the historical entity relation as a second relation weight.

Specifically, the enterprise text information not containing enterprise relation instances means that there is no relation instance in the enterprise text information, and the entity relation in the relation instance refers to a continuous entity relation between enterprises. The continuous entity relation means that the relation will last for a period of time but is not a one-time event relation. For example, competition, cooperation, holding and supply are all continuous competitive relations.

When the enterprise text information does not contain enterprise relation instances, it is impossible to directly acquire the corresponding weight, and it is necessary to backtrack the historical text information corresponding to the enterprise text information. For example, if there was no competitive relation between enterprise A and enterprise B in June 2000, that is, there was no relation instance in June 2000, in this case, it is impossible to calculate the corresponding weight according to the enterprise text information. Thus, it is necessary to backtrack the historical text information of this relation in January 2000 and calculate the weight corresponding to the historical entity relation in the historical text information, and the weight corresponding to the historical entity relation is used as the second relation weight.

Preferably, the weight of an entity relation when no enterprise business relation occurs within a specific period of time is calculated by using the temporal order interpolation algorithm, wherein the temporal order interpolation algorithm may be a linear interpolation algorithm or a polynomial interpolation algorithm. Thus, any continuous relation between any enterprises within the specified period of time has a weight at any time, thereby ensuring the accuracy of data.

In step 4, an entity relation having the first relation weight or the second relation weight meeting a preset reference condition is used as a standard entity relation.

In the embodiment of the present invention, both the first relation weight and the second relation weight are used for describing the occurrence frequency of an entity relation, wherein the first relation weight is calculated when the enterprise relation instance contains entity relations, and the second relation weight is obtained by calculating the historical text information using the preset temporal order interpolation algorithm when the enterprise relation instance does not contain entity relations. The first relation weight or the second relation weight is compared with the preset reference condition, and an entity relation meeting the preset reference condition is used as a standard entity relation.

In the embodiment of the present invention, an enterprise relation instance in enterprise text information is extracted to obtain data after preliminary screening of text information, and key entities in the enterprise relation instance are extracted by using a graph sorting algorithm, so that the key entities can be obtained accurately; a first relation weight of the key entities and a second relation weight of the enterprise text information after deletion of the enterprise relation instance are identified, respectively; and an entity relation satisfying a preset reference condition is screened out according to the first relation weight and the second relation weight. The occurrence frequency of the entity relation is analyzed from the perspective of weight by using the first relation weight and the second relation weight, so the screened standard entity relation is more accurate and more efficient. Therefore, the entity relation mining apparatus provided by the present invention can solve the problem of low accuracy in entity relation mining.

Figure 4:
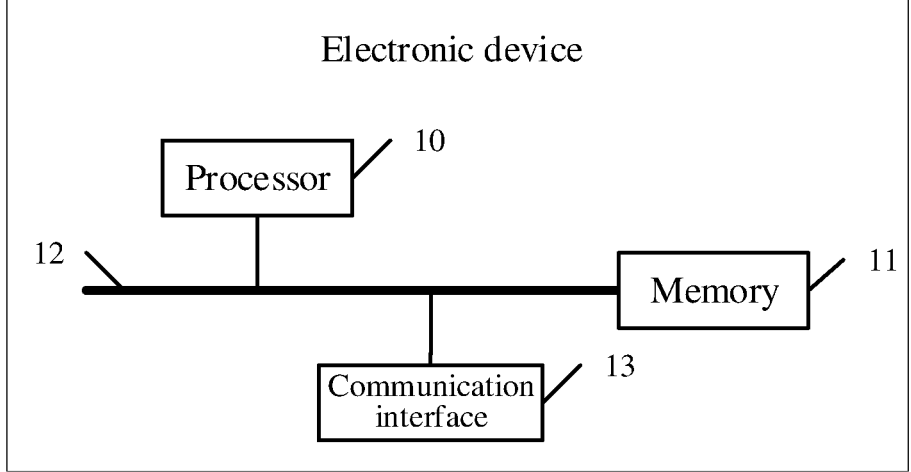
FIG. 4 is a schematic structure diagram of an electronic device for implementing the entity relation mining method according to an embodiment of the present invention.

As shown in FIG. 4, a schematic structure diagram of an electronic device for implementing an entity relation mining method according to an embodiment of the present invention is shown.

The electronic device 1 may include a processor, a memory 11, a communication bus 12 and a communication interface 13, and may further include computer programs, such as an entity relation mining program, which are stored in the memory 11 and can be run on the processor 10.

In some embodiments, the processor 10 may be composed of integrated circuits, for example, being composed of a single packaged integrated circuit, or being composed of a plurality of integrated circuits packaged with the same or different functions, including one or more central processing units (CPUs), microprocessors, digital processing chips, graphics processors, combinations of various control chips or the like. The processor 10, as a control unit of the electronic device, connects the components of the whole electronic device by using various interfaces and lines, and executes various functions of the electronic device and processes data by running or executing the programs or modules (e.g., executing the entity relation mining program, etc.) stored in the memory 11 and calling the data stored in the memory 11.

The memory 11 includes at least one type of readable storage medium, and the readable storage mediums include flash memories, mobile hard disks, multimedia cards, card-type memories (SD or DX memories, etc.), magnetic memories, magnetic disks, optical disks, etc. In some embodiments, the memory 11 may be an internal storage unit of the electronic device, for example, a mobile hard disk of the electronic device. In other embodiments, the memory 11 may also be an external storage device of the electronic device, for example, a plug-in type hard disk, a smart media card (SMC), a secure digital (SD) card, a flash card or the like equipped on the electronic device. Further, the memory 11 may also include both the internal storage unit of the electronic device and the external storage device. The memory 11 may be configured to store application software and various data installed in the electronic device, for example, codes of the entity relation mining program or the like, and may also be configured to temporarily store data that has been output or will be output.

The communication bus 12 may be a peripheral component interconnect (PCI) bus, an extended industry standard architecture (EISA) bus or the like. The bus may be classified into an address bus, a data bus, a control bus or the like. The bus is arranged to realize connection communication between the memory 11 and at least one processor 10, etc.

The communication interface 13 is configured for communication between the electronic device and other devices, and includes a network interface and a user interface.

Optionally, the network interface may include a wired interface and/or a wireless interface (e.g., a WI-FI interface, a Bluetooth interface, etc.), which is generally configured to establish a communication connection between the electronic device and other electronic devices. The user interface may be a display or an input unit (e.g., a keyboard). Optionally, the user interface may also be a standard wired interface or wireless interface. Optionally, in some embodiments, the display may be an LED display, a liquid crystal display, a touch-control liquid crystal display, an organic light-emitting diode (OLED) touch device or the like. The display may also be appropriately called a display screen or display unit configured to display information processed in the electronic device and display a visual user interface.

FIG. 4 only shows an electronic device with components. It should be understood by those skilled in the art that the electronic device 1 is not limited by the structure shown in FIG. 4, and may include fewer or more components than those shown, or combinations of some components, or different component arrangements.

For example, although not shown, the electronic device may further include a power supply (e.g., a battery) for supplying power to various components. Preferably, the power supply is logically connected to the at least one processor 10 through a power management apparatus, so as to realize charging management, discharging management, power consumption management or other functions through the power supply management apparatus. The power supply may further include one or more direct-current or alternating-current power supplies, rechargeable apparatuses, power failure detection circuits, power converters or inverters, power status indicators or any other components. The electronic device may further include various sensors, Bluetooth modules, Wi-Fi modules or the like, which will not be repeated here.

It should be understood that the embodiment is merely for illustration purposes and the patent application scope is not limited to this structure.

The entity relation mining program stored in the memory 11 in the electronic device 1 is a combination of a plurality of instructions that, when run in the processor 10, can implement:

acquiring enterprise text information, and extracting an enterprise relation instance in the enterprise text information;

performing key entity extraction on the enterprise relation instance by using a preset graph sorting algorithm to obtain a key entity set;

identifying an entity relation between key entities in the key entity set and a first relation weight corresponding to the entity relation, deleting the enterprise relation instance from the enterprise text information, and performing, by using a preset temporal order interpolation algorithm, weight calculation on the enterprise text information after deletion of the enterprise relation instance to obtain a second relation weight; and using an entity relation having the first relation weight or the second relation weight meeting a preset reference condition as a standard entity relation.

Specifically, the specific implementation methods of the above instructions by the processor 10 may refer to the description of the related steps in the corresponding embodiments in the drawings, and will not be repeated here.

Further, if the modules/units integrated into the electronic device 1 are implemented in the form of software functional units and sold or used as separate products, they may be stored in a storage medium. The storage medium may be volatile or non-volatile. For example, the computer readable medium may include: any entity or apparatus capable of carrying the computer program codes, a recording medium, a U disk, a mobile hard disk, a magnetic disk, an optical disk, a computer memory, and a read-only memory (ROM).

The present invention further provides a storage medium. The readable storage medium has computer programs stored thereon that, when executed by a processor of an electronic device, can implement:

acquiring enterprise text information, and extracting an enterprise relation instance in the enterprise text information;

performing key entity extraction on the enterprise relation instance by using a preset graph sorting algorithm to obtain a key entity set;

identifying an entity relation between key entities in the key entity set and a first relation weight corresponding to the entity relation, deleting the enterprise relation instance from the enterprise text information, and performing, by using a preset temporal order interpolation algorithm, weight calculation on the enterprise text information after deletion of the enterprise relation instance to obtain a second relation weight; and using an entity relation having the first relation weight or the second relation weight meeting a preset reference condition as a standard entity relation.

In the embodiments provided by the present application, it should be understood that the disclosed device, apparatus and method may be implemented in other ways. For example, the apparatus embodiment described above is only illustrative. For example, the division of the modules is only the division of logical functions, and other division modes are possible in actual implementations.

The modules described as separate components may be or may not be physically separated, and the components displayed as modules may be or may not be physical units. That is, they may be located in one place or distributed on a plurality of network units. Some or all of the modules may be selected according to actual needs to achieve the objectives of the solutions of the embodiments.

In addition, the functional units in the embodiments of the present invention may be integrated into one processing module; or, each unit may physically exist alone; or, two or more units may be integrated into one unit. The integrated modules may be implemented in the form of hardware, or may be implemented in the form of hardware and software functional modules.

It is obvious for those skilled in the art that the present invention is not limited to the details of the above exemplary embodiments, and the present invention may be implemented in other specific forms without departing from the spirit or essential features of the present invention.

Therefore, from any point of view, the embodiments should be regarded as being exemplary but not limiting, and the scope of the present invention should be defined by the appended claims instead of the above description, so all variations made within the meanings and scopes of equivalents of the claims shall be included in the present invention. Any associated reference numeral in the claims should not be regarded as limiting the involved claims.

The blockchain in the present invention is a novel application mode of computer technologies such as distributed data storage, point-to-point transmission, consensus mechanism and encryption algorithm. The blockchain is essentially a decentralized database, and is a series of data blocks associated by cryptography. Each data block contains information of a batch of network transactions, which is used for verifying the validity (anti-counterfeiting) of the information and generating a next block. The blockchain may include a blockchain underlying platform, a platform product service layer, an application service layer or the like.

In the embodiments of the present application, the acquisition and processing of related data may be performed based on the artificial intelligence technology. Artificial intelligence (AI) is a theory, method, technology and application system that uses a digital computer or a digital computer controlled machine to simulate, extend and expand human intelligence, perceive the environment, acquire knowledge and obtain the best results using the knowledge.

In addition, obviously, the word "include" does not exclude other units or steps, and the singular form does not exclude plural forms. A plurality of units or apparatuses stated in the system claims may also be implemented by one unit or apparatus through software or hardware. First, second or other words are used to indicate names, but do not indicate any particular order.

Finally, it should be noted that the above embodiments are merely for describing, rather than limiting, the technical solutions of the present invention. Although the present invention has been described in detail above by preferred embodiments, it should be understood by a person of ordinary skill in the art that modifications or equivalent replacements can be made to the technical solutions of the present invention without departing from the spirit and scope of the technical solutions of the present invention.

What is claimed is:

1. A computer-implemented entity relation mining method for processing a large volume of enterprise data, the entity relation mining method comprising:

acquiring enterprise text information comprising a plurality of documents, and extracting a plurality of enterprise relation instances from the enterprise text information by processing the enterprise text information using at least one processor;

performing key entity extraction on each of the plurality of enterprise relation instances by using a preset graph sorting algorithm to obtain a key entity set, comprising:

performing instance analysis on the enterprise relation instance to obtain instance analysis data;

performing tokenization and screening on the instance analysis data to obtain a standard token set;

constructing a directed weighted graph according to standard tokens in the standard token set, and calculating node weights corresponding to a plurality of nodes in the directed weighted graph; and using the nodes having node weights exceeding a preset threshold in the directed weighted graph as key entities, and performing entity collection on the plurality of key entities to obtain a key entity set;

identifying each of a plurality of entity relations between key entities in the key entity set and a first relation weight corresponding to the entity relation, deleting the enterprise relation instance from the enterprise text information, and performing, by using a preset temporal order interpolation algorithm comprising linear interpolation or polynomial interpolation, weight calculation on the modified enterprise text information after deletion of the enterprise relation instance to obtain a second relation weight, wherein the first relation weight is calculated based on an occurrence frequency of the entity relation within a preset time period; and selecting, as a standard entity relation, either the entity relation associated with the first relation weight or an entity relation derived based on the second relation weight, by evaluating the first relation weight and the second relation weight against a preset reference condition; wherein the performing, by using a preset temporal order interpolation algorithm, weight calculation on the enterprise text information after deletion of the enterprise relation instance to obtain a second relation weight comprises:

in response to determining that the enterprise text information does not contain enterprise relation instances, backtracking historical enterprise text information corresponding to the enterprise text information by querying a separate corpus of historical enterprise text information temporally preceding the enterprise text information; and extracting historical entity relations from the historical enterprise text information, applying the temporal order interpolation algorithm to the historical entity relations to calculate a weight of the historical entity relation as the second relation weight.

2. The entity relation mining method according to claim 1, wherein the performing tokenization and screening on the instance analysis data to obtain a standard token set comprises:

performing sentence segmentation on the instance analysis data according to a preset symbol to obtain a segmented sentence set; deleting stop words in the segmented sentence set, and performing tokenization on segmented sentences after deletion of the stop words to obtain an initial token set; and performing part-of-speech tagging on a plurality of initial tokens in the initial token set, and reserving initial tokens consistent with a preset specified part of speech as standard tokens to obtain a standard token set.

3. The entity relation mining method according to claim 1, wherein the node weights corresponding to a plurality of nodes in the directed weighted graph are calculated by a following method:

$$WS(V_i) = (1-d) + d * \sum_{V_j \in In(V_i)} \frac{W_{ji}}{\sum_{V_k \in Out(V_j)} W_{jk}} WS(V_j) \qquad 45$$

where $WS(V_i)$ represents a node weight of a node $V_i$, d is a damping coefficient, $In(V_i)$ is a first node set pointing to the node $V_i$, $Out(V_j)$ is a second node set pointed by the node $V_j$, $W_{ji}$ is a connection weight between nodes $V_i$ and $V_j$, and $W_{jk}$ is a connection weight between nodes $V_k$ and $V_j$.

4. An electronic device, the electronic device comprising: at least one processor; and
a memory in communication connection to the at least one processor, wherein,
the memory stores thereon computer programs executable by the at least one processor that, when executed by the at least one processor, enable the at least one processor to execute a computer-implemented entity relation mining method for processing a large volume of enterprise data, the entity relation mining method comprising:
acquiring enterprise text information comprising a plurality of documents, and extracting a plurality of enterprise relation instances from the enterprise text information by processing the enterprise text information using the at least one processor;

performing key entity extraction on each of the plurality of enterprise relation instances by using a preset graph sorting algorithm to obtain a key entity set, comprising:

performing instance analysis on the enterprise relation instance to obtain instance analysis data;

performing tokenization and screening on the instance analysis data to obtain a standard token set;

constructing a directed weighted graph according to standard tokens in the standard token set, and calculating node weights corresponding to a plurality of nodes in the directed weighted graph; and using the nodes having node weights exceeding a preset threshold in the directed weighted graph as key entities, and performing entity collection on the plurality of key entities to obtain a key entity set;

identifying each of a plurality of entity relations between key entities in the key entity set and a first relation weight corresponding to the entity relation, deleting the enterprise relation instance from the enterprise text information, and performing, by using a preset temporal order interpolation algorithm comprising linear interpolation or polynomial interpolation, weight calculation on the modified enterprise text information after deletion of the enterprise relation instance to obtain a second relation weight, wherein the first relation weight is calculated based on an occurrence frequency of the entity relation within a preset time period; and selecting, as a standard entity relation, either the entity relation associated with the first relation weight or an entity relation derived based on the second relation weight, by evaluating the first relation weight and the second relation weight against a preset reference condition;

wherein the performing, by using a preset temporal order interpolation algorithm, weight calculation on the enterprise text information after deletion of the enterprise relation instance to obtain a second relation weight comprises:

in response to determining that the enterprise text information does not contain enterprise relation instances, backtracking historical enterprise text information corresponding to the enterprise text information by querying a separate corpus of historical enterprise text information temporally preceding the enterprise text information; and extracting historical entity relations from the historical enterprise text information, applying the temporal order interpolation algorithm to the historical entity relations to calculate a weight of the historical entity relation as the second relation weight.

5. The electronic device according to claim 4, wherein the performing tokenization and screening on the instance analysis data to obtain a standard token set comprises:

performing sentence segmentation on the instance analysis data according to a preset symbol to obtain a segmented sentence set;

deleting stop words in the segmented sentence set, and performing tokenization on segmented sentences after deletion of the stop words to obtain an initial token set; and performing part-of-speech tagging on a plurality of initial tokens in the initial token set, and reserving initial tokens consistent with a preset specified part of speech as standard tokens to obtain a standard token set.

6. The electronic device according to claim 4, wherein the node weights corresponding to a plurality of nodes in the directed weighted graph are calculated by a following method:

$$WS(V_i) = (1 - d) + d * \sum\nolimits_{V_j \in In(V_i)} \frac{W_{ji}}{\sum\nolimits_{V_k \in Out(V_j)} W_{jk}} WS(V_j)$$

where $WS(V_i)$ represents a node weight of a node $V_i$, d is a damping coefficient, $In(V_i)$ is a first node set pointing to the node $V_i$, $Out(V_j)$ is a second node set pointed by the node $V_j$, $W_{ji}$ is a connection weight between nodes $V_i$ and $V_j$, and $W_{jk}$ is a connection weight between nodes $V_k$ and $V_j$.

7. A non-transitory computer readable storage medium having computer programs stored thereon that, when executed by a processor, implement a computer-implemented entity relation mining method for processing a large volume of enterprise data, the entity relation mining method comprising:

acquiring enterprise text information comprising a plurality of documents, and extracting a plurality of enterprise relation instances from the enterprise text information by processing the enterprise text information using the processor;

performing key entity extraction on each of the plurality of enterprise relations instance by using a preset graph sorting algorithm to obtain a key entity set, comprising:

performing instance analysis on the enterprise relation instance to obtain instance analysis data;

performing tokenization and screening on the instance analysis data to obtain a standard token set;

constructing a directed weighted graph according to standard tokens in the standard token set, and calculating node weights corresponding to a plurality of nodes in the directed weighted graph; and using the nodes having node weights exceeding a preset threshold in the directed weighted graph as key entities, and performing entity collection on the plurality of key entities to obtain a key entity set;

identifying each of a plurality of entity relations between key entities in the key entity set and a first relation weight corresponding to the entity relation, deleting the enterprise relation instance from the enterprise text information, and performing, by using a preset temporal order interpolation algorithm comprising linear interpolation or polynomial interpolation, weight calculation on the modified enterprise text information after deletion of the enterprise relation instance to obtain a second relation weight, wherein the first relation weight is calculated based on an occurrence frequency of the entity relation within a preset time period; and selecting, as a standard entity relation, either the entity relation associated with the first relation weight or an entity relation derived based on the second relation weight, by evaluating the first relation weight and the second relation weight against a preset reference condition;

wherein the performing, by using a preset temporal order interpolation algorithm, weight calculation on the enterprise text information after deletion of the enterprise relation instance to obtain a second relation weight comprises:

in response to determining that the enterprise text information does not contain enterprise relation instances, backtracking historical enterprise text information corresponding to the enterprise text information by querying a separate corpus of historical enterprise text information temporally preceding the enterprise text information; and extracting historical entity relations from the historical enterprise text information, applying the temporal order interpolation algorithm to the historical entity relations to calculate a weight of the historical entity relation as the second relation weight.

8. The non-transitory computer readable storage medium according to claim 7, wherein the node weights corresponding to a plurality of nodes in the directed weighted graph are calculated by a following method:

$$WS(V_i) = (1 - d) + d * \sum\nolimits_{V_j \in In(V_i)} \frac{W_{ji}}{\sum\nolimits_{V_k \in Out(V_j)} W_{jk}} WS(V_j)$$

where $WS(V_i)$ represents a node weight of a node $V_i$, d is a damping coefficient, $In(V_i)$ is a first node set pointing to the node $V_i$, $Out(V_j)$ is a second node set pointed by the node $V_j$, $W_{ji}$ is a connection weight between nodes $V_i$ and $V_j$, and $W_{jk}$ is a connection weight between nodes $V_k$ and $V_j$.

* * * * *